United States Patent
Yang

(10) Patent No.: US 8,681,910 B2
(45) Date of Patent: Mar. 25, 2014

(54) HYBRID EQUALIZATION SYSTEM

(75) Inventor: Fang-Ming Yang, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 707 days.

(21) Appl. No.: 12/929,145

(22) Filed: Jan. 4, 2011

(65) Prior Publication Data

US 2012/0051418 A1 Mar. 1, 2012

(30) Foreign Application Priority Data

Aug. 26, 2010 (TW) .............................. 99128662 A

(51) Int. Cl.
*H04L 27/06* (2006.01)
(52) U.S. Cl.
USPC .......................................... 375/341; 375/233
(58) Field of Classification Search
USPC .................. 375/316, 340, 341, 229, 232, 233
See application file for complete search history.

(56) References Cited

U.S. PATENT DOCUMENTS

| 5,363,411 | A * | 11/1994 | Furuya et al. ................. 375/316 |
| 6,304,599 | B1 * | 10/2001 | Igarashi ......................... 375/232 |
| 2007/0058709 | A1 * | 3/2007 | Chen et al. ..................... 375/231 |

* cited by examiner

*Primary Examiner* — Kevin M Burd
(74) *Attorney, Agent, or Firm* — Bacon & Thomas, PLLC

(57) ABSTRACT

A hybrid equalization system includes an equalization device, a target channel impulse response device, a maximum likelihood sequence estimation device and a multiplexer. The equalization device receives a sampled baseband signal and performs an equalization operation thereon for generating first estimated symbols. The target channel impulse response device convolutes the first estimated symbol and a predetermined target channel response function for generating a training symbol corresponding to a target channel. The maximum likelihood sequence estimation device performs a maximum likelihood sequence estimation on the sampled baseband signal trained by first estimated symbols based on the target channel impulse response for generating second estimated symbols. The multiplexer selects the first estimated symbol or the second estimated symbol as an output of the hybrid equalization system according to a selection signal.

11 Claims, 6 Drawing Sheets

HYBRID EQUALIZATION SYSTEM

BACKGROUND OF THE INVENTION

1. Field of the Invention

The present invention relates to the technical field of wireless communications and, more particularly, to a hybrid equalization system.

2. Description of Related Art

A wireless transmitting signal may be interfered by noises, and also subjected to the problem of channel fading or multi-channel interference. In addition, inter-symbol interferences (ISIs) are present at a receiver. Accordingly, equalizers are used to overcome or reduce the ISIs.

Typically, the equalizers are categorized into several types: (1) an equalizer implemented with maximum likelihood sequence estimation, which is deemed as the optimal in view of error probability; (2) a linear filter with adjustable coefficients; (3) a decision feedback equalizer for cancelling the ISIs by means of a previously detected symbol.

FIG. 1 shows a configuration of a typical decision feedback equalizer (DFE). As shown in FIG. 1, the equalizer 100 includes a feed-forward equalizer 110, a feedback equalizer 120, and a decision device 130. The feed-forward equalizer 110 and the feedback equalizer 120 are each a symbol spaced equalizer. The decision device 130 is based on a previously detected symbol to generate a decisive value. The feedback equalizer 120 receives an output of the decision device 130 for use as an input to cancel a part of the ISIs in a currently estimated symbol.

FIG. 2 is a configuration of a typical predictive DFE. As shown in FIG. 2, the equalizer 200 includes a feed-forward equalizer 210 and a feedback equalizer 220. A symbol data r(n) is input to the feed-forward equalizer 210, and an adder adds output values of the feed-forward equalizer 210 and the feedback equalizer 220 to thereby obtain an equalized result y(n). The decision device 240 is based on the equalized result y(n) to generate a quantized symbol signal d(n) to indicate a coarse result for a wireless transmitting signal received. The quantized symbol signal d(n) is then fed back to the feedback equalizer 220. The decision device 240 can be a slicer to slice an output of the equalizers into special quantity levels. The slicing means that a continuous value is changed into discontinuously special orders of value. The comparator 250 compares the quantized symbol signal d(n) with the equalized result y(n) to thereby generate an error signal e(n). Basically, the error signal e(n) is a difference between the quantized symbol signal d(n) and the equalized result y(n). The error signal e(n) is sent to the feed-forward equalizer 210 and the feedback equalizer 220 in order to update their coefficients by a least mean square (LMS) operation.

When the receiver starts to receive a wireless signal, the transmitter sends a preamble to set the receiver or initialize the coefficients of the feed-forward and the feedback equalizers 210 and 220, followed by transmitting data by the transmitter. Thus, the feed-forward equalizer 210 and the feedback equalizer 220 at the receiver can effectively cancel the ISIs. However, in new wireless communication protocols, the amount of preamble data is typically set very little for increasing the amount of data transmission, and in this case the equalizer 200 cannot cancel the ISIs effectively by obtaining the coefficients of the feed-forward and the feedback equalizers 210 and 220. In addition, the transmission in a wireless channel is typically interfered by noises, as well as channel fading or multi-channel interference. Accordingly, the channel estimation cannot be effectively performed to update the coefficients of the feed-forward and the feedback equalizers 210 and 220.

Therefore, it is desirable to provide an improved hybrid equalization system to mitigate and/or obviate the aforementioned problems.

SUMMARY OF THE INVENTION

The object of the present invention is to provide a hybrid equalization system, which provides the function of MLSE equalizer without channel estimation when the amount of preamble symbols in a transmitting signal is very few.

According to one aspect of the invention, a hybrid equalization system is provided, which is used in a receiver of a wireless communication system. The hybrid equalization system includes a decision feedback equalization device, a target channel impulse response device, a maximum likelihood sequence estimation device, and a multiplexer. The decision feedback equalization device receives a sampled baseband signal and performs an equalization operation on the sampled baseband signal for generating a first estimated symbol. The target channel impulse response device is connected to the equalization device in order to receive the first estimated symbol for generating a target channel impulse response and a training symbol corresponding to the target channel impulse response according to a predetermined target channel response function. The maximum likelihood sequence estimation device is connected to the target channel impulse response device in order to receive the sampled baseband signal, the target channel impulse response, and the training symbol for performing a maximum likelihood sequence estimation on the sampled baseband signal trained by the training symbol and generating a second estimated symbol. The multiplexer is connected to the equalization device and the maximum likelihood sequence estimation device in order to select the first estimated symbol or the second estimated symbol as an output of the hybrid equalization system according to a selection signal.

According to another aspect of the invention, a hybrid equalization system is provided, which is used in a receiver of a wireless communication system. The hybrid equalization system includes an equalization device, a target channel impulse response device, a maximum likelihood sequence estimation device, and a multiplexer. The equalization device receives a sampled baseband signal and performs an equalization operation on the sampled baseband signal for generating a first estimated symbol. The target channel impulse response device is connected to the equalization device in order to receive the first estimated symbol for generating a target channel and corresponding training symbol according to a predetermined target channel response function. The maximum likelihood sequence estimation device is connected to the target channel impulse response device in order to receive the sampled baseband signal, the target channel impulse response, and a training symbol corresponding to the target channel impulse response for performing a maximum likelihood sequence estimation on the sampled baseband signal trained by the training symbol and generating a second estimated symbol. The multiplexer is connected to the equalization device and the maximum likelihood sequence estimation device in order to select the first estimated symbol or the second estimated symbol as an output of the hybrid equalization system according to a selection signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
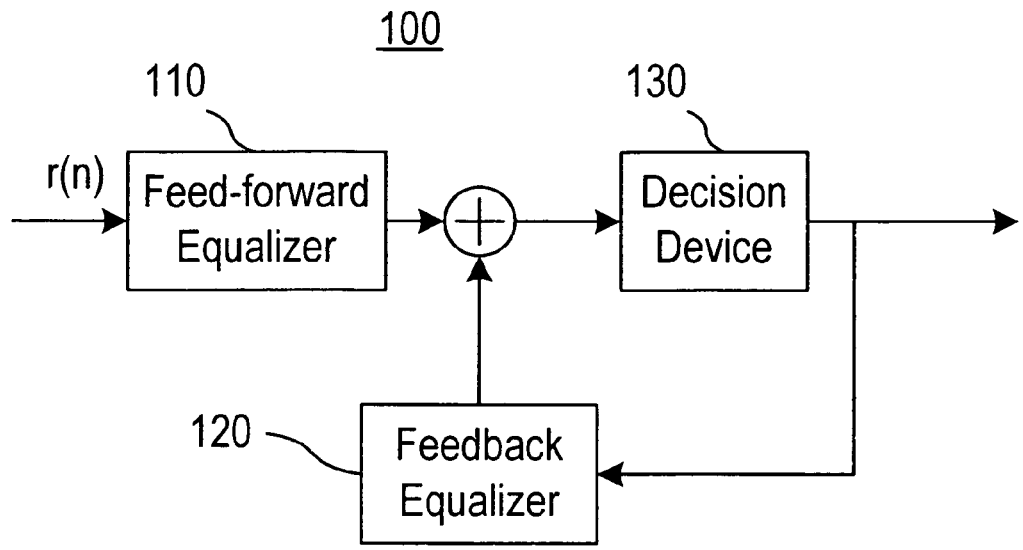
FIG. 1 schematically illustrates a configuration of typical decision feedback equalizer.
Figure 2:
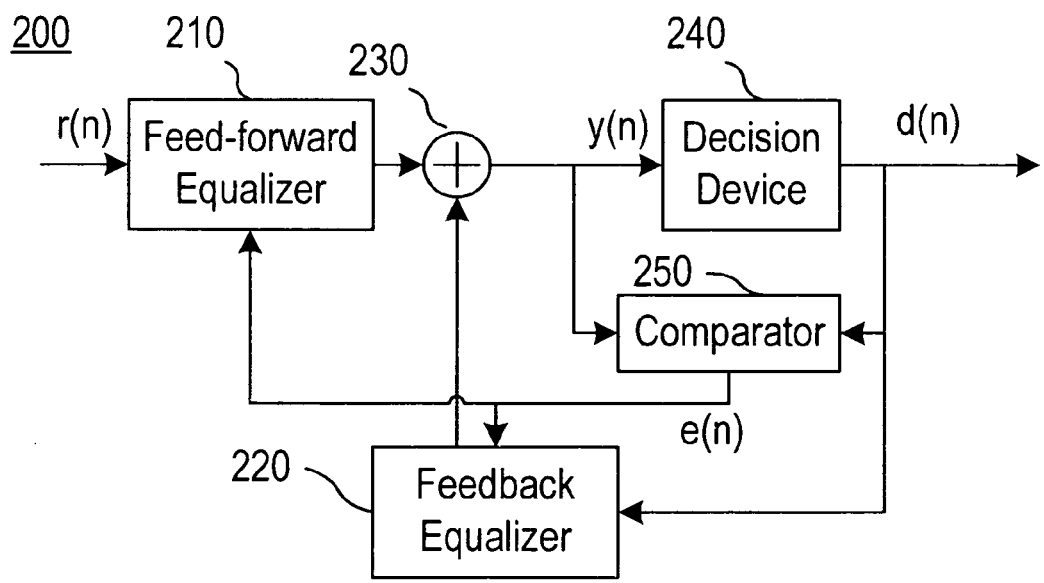
FIG. 2 schematically illustrates a configuration of typical predictive feedback equalizer.
Figure 3:
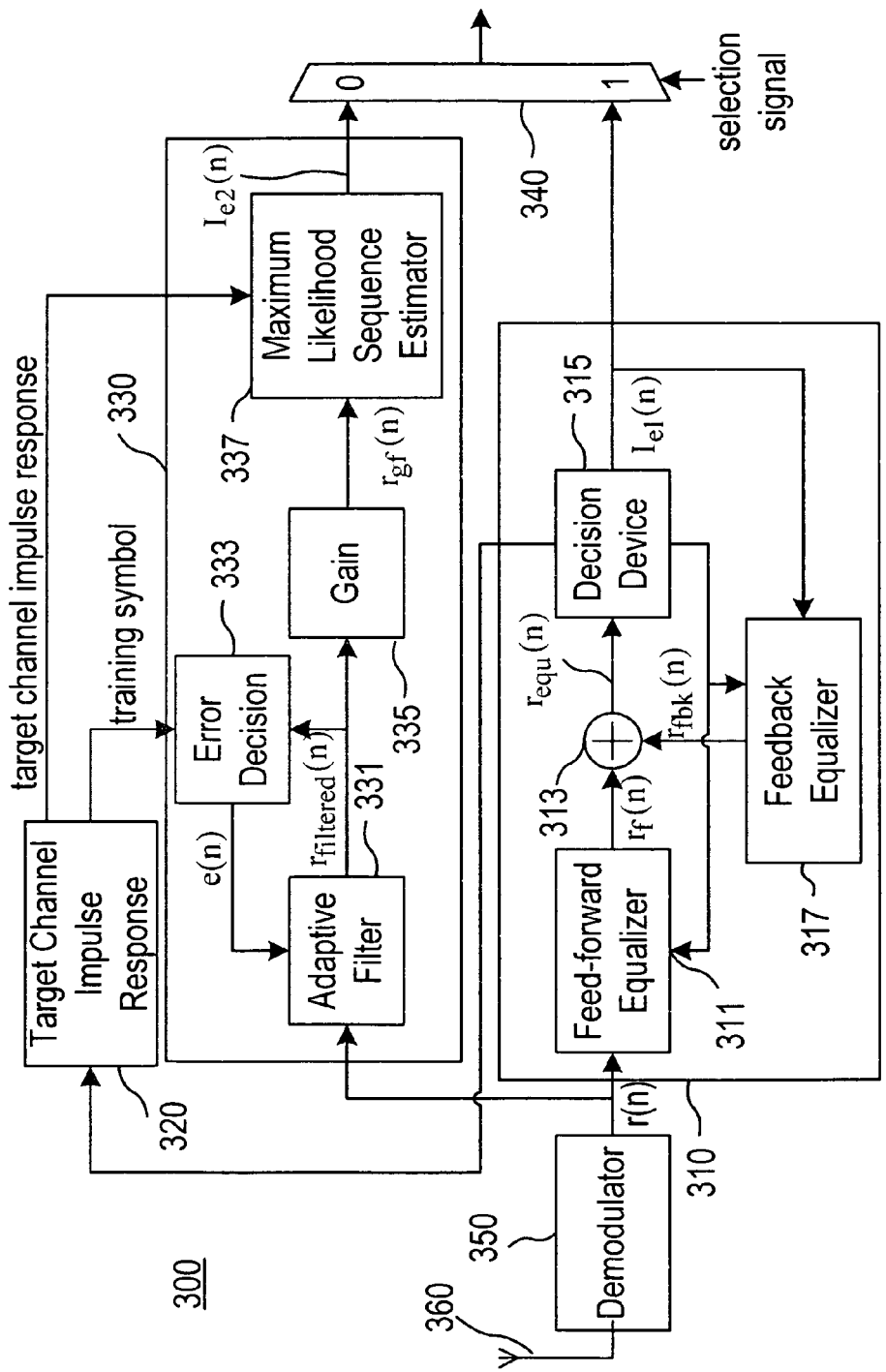
FIG. 3 is a block diagram of the hybrid equalization system according to an embodiment of the invention.

FIG. 3 is a block diagram of the hybrid equalization system 300 according to an embodiment of the invention, which is used in a receiver of a wireless transmission system for compensating a wireless channel fading and reducing the inter-symbol interferences (ISIs). As shown, the hybrid equalization system 300 includes a decision feedback equalization device 310, a target channel impulse response device 320, a maximum likelihood sequence estimation device 330, a multiplexer 340, and a demodulator 350.

The demodulator 350 receives a radio signal via an antenna 360 for performing an analog to digit conversion, carrier recovery, and timing recovery operation on the radio signal, thereby converting the radio signal into a sampled baseband signal r(n).

The sampled baseband signal r(n) output by the demodulator 350 can be fractionally spaced. The demodulator 350 outputs two or four sampled baseband signals r(n) every other symbol interval when performing the analog to digital conversion.

The decision feedback equalization device 310 is connected to the demodulator 350 in order to receive the sampled baseband signal r(n) output by the demodulator 350 and perform an equalization operation on the sampled baseband signal r(n) for generating a corresponding first estimated symbol $I_{e1}(n)$.

The decision feedback equalization device 310 includes a feed-forward equalizer 311, an adder 313, a decision device 315, and a feedback equalizer 317.

The feed-forward equalizer 311 is connected to the demodulator 350 in order to filter the sampled baseband signal r(n) and generate a feed-forward equalization signal $r_f(n)$, thereby canceling the pre-cursor ISI in the signal r(n) and compensating the radio signal for the wireless channel fading or multi-channel interference caused when the radio signal is transmitted through a wireless channel from the transmitter to the receiver.

The feed-forward equalizer 311 is connected to the decision device 315 in order to update the coefficients according to the sampled baseband signal r(n) and a symbol error. For example, the feed-forward equalizer 311 is based on the sampled baseband signal r(n) and corresponding symbol error to update their coefficients by a least mean square (LMS) operation.

The demodulator 350 outputs one sampled baseband signal r(n) every other symbol interval, and in this case the feed-forward equalizer 311 is a symbol spaced equalizer. Alternatively, the demodulator 350 outputs two or four sampled baseband signal r(n) every other symbol interval, and in this case the feed-forward equalizer 311 is a fractionally spaced equalizer.

The adder 313 is connected to the feed-forward equalizer 311 in order to receive the feed-forward equalization signal $r_f(n)$ and a feedback equalization signal $r_{fbk}(n)$ and add them to generate an equalization signal $r_{equ}(n)$.

The decision device 315 is connected to the adder 313 in order to receive the equalization signal $r_{equ}(n)$ and compare it with multiple equalized signal levels for selecting the one closest to the equalization signal for output as the first estimated symbol $I_{e1}(n)$. The decision device 315 can be a slicer to slice the output of the equalizers into the special quantity levels.

The slicer 315 can be such a slicer that meets with any specification at the transmitter. For example, when the slicer is an 8-level slicer, the equalization signal $r_{equ}(n)$ is received and compared with eight predetermined equalized signal levels, and the slicer 315 selects an equalized signal level that is closet to the equalization signal $r_{equ}(n)$ for output as the first estimated symbol $I_{e1}(n)$.

The feedback equalizer 317 is connected to the decision device 315 and the adder 313 in order to filter the first estimated symbol $I_{e1}(n)$ and generate the feedback equalization signal $r_{fbk}(n)$, thereby canceling the post-cursor ISI in the sampled baseband signal r(n) and using the first estimated symbol $I_{e1}(n)$ and the symbol error to update the coefficients.

The target channel impulse response device 320 is connected to the equalization device 315 in order to receive the first estimated symbol $I_{e1}(n)$ and generate a target channel impulse response (target CIR) and corresponding training symbol according to a predetermined target channel response function h(t). The target channel impulse response device 320 performs a convolution operation on the first estimated symbol $I_{e1}(n)$ and the predetermined target channel response function h(t) for generating the training symbol corresponding to the target CIR.

The maximum likelihood sequence estimation device 330 is connected to the target channel impulse response device 320 and the demodulator 350 in order to receive the sampled baseband signal r(n) at an input rate of one symbol interval for using the target CIR to perform a maximum likelihood sequence estimation on the sampled baseband signal r(n) trained by the training symbol, thereby generating a second estimated symbol $I_{e2}(n)$.

The maximum likelihood sequence estimation device 330 includes an adaptive filter 331, an error decision device 333, a gain device 335, and a maximum likelihood sequence estimator 337.

The adaptive filter 331 is connected to the demodulator 350 in order to receive the sampled baseband signal r(n) at an input rate of one symbol interval and filter the signal r(n) for generating a filtered signal $r_{filtered}(n)$.

The error decision device 333 is connected to the target CIR device 320 and the adaptive filter 331 in order to generate an error signal e(n) according to the training symbol corresponding to the target CIR and the filtered signal $r_{filtered}(n)$ for updating the coefficients of the adaptive filter 331.

Figure 4:
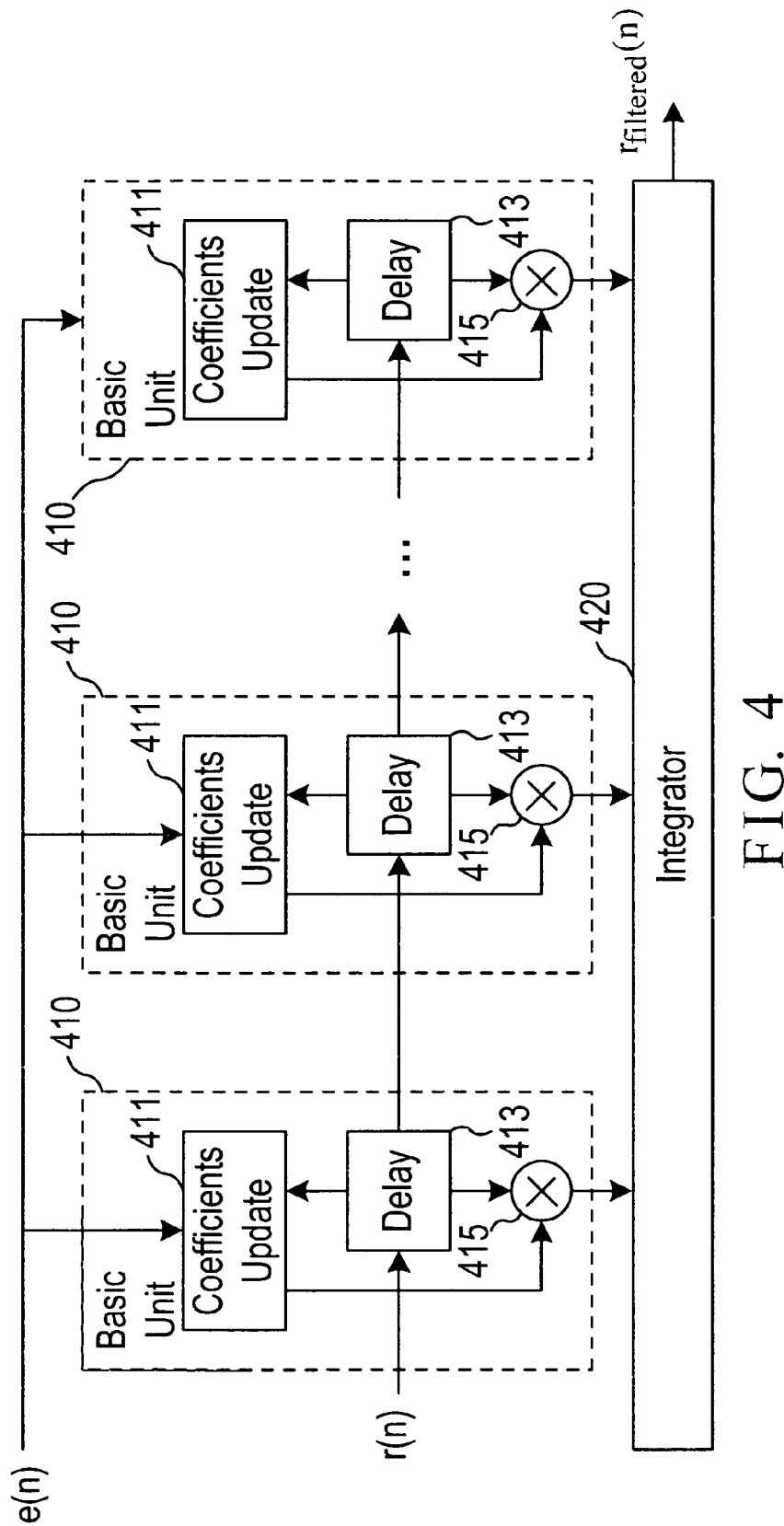
FIG. 4 is a block diagram of an adaptive filter according to the invention.

FIG. 4 is a block diagram of the adaptive filter 331 according to the invention. As shown in FIG. 4, the adaptive filter 331 includes a plurality of basic units 410 and an integrator 420. Each of the basic units 410 includes a coefficients update device 411, a delay unit 413, and a multiplier 415. All the delay units 413 are cascaded to form a delay line for receiving the sampled baseband signal r(n). The multiplier 415 multiplies the outputs of the coefficients update device 411 and delay unit 413 for generating a filtered value. The integrator 420 combines all the filtered values into the filtered signal. The integrator 420 is preferably an adder.

The maximum likelihood sequence estimation device 330 is based on the error signal e(n) output by the error decision device 333 to update the coefficients of the adaptive filter 331 such that the output of the adaptive filter 331 approaches to the output of the target CIR device 320.

The gain device 335 is connected to the adaptive filter 331 in order to perform a gain adjustment on the filtered signal for generating a gained filter signal $r_{gf}(n)$.

The maximum likelihood sequence estimator 337 is connected to the gain device 335 and the target CIR device 320 in order to perform a maximum likelihood sequence estimation on the target CIR and gained filter signal for generating the second estimated symbol $I_{e2}(n)$. The gain device 335 performs a gain adjustment on the sampled baseband signal trained by the training symbol, so that the maximum likelihood sequence estimator 337 is considered performing the maximum likelihood sequence estimation on the sampled baseband signal trained by the training symbol.

The multiplexer 340 is connected to the equalization device 310 and the maximum likelihood sequence estimation device 330 in order to select the first estimated symbol $I_{e1}(n)$ or the second estimated symbol $I_{e2}(n)$ for use as an output of the hybrid equalization system according to a selection signal. The selection signal is generated by symbols known in the specification of the transmitter and the determined first and second estimated symbols according to a symbol error rate (SER).

Figure 5:
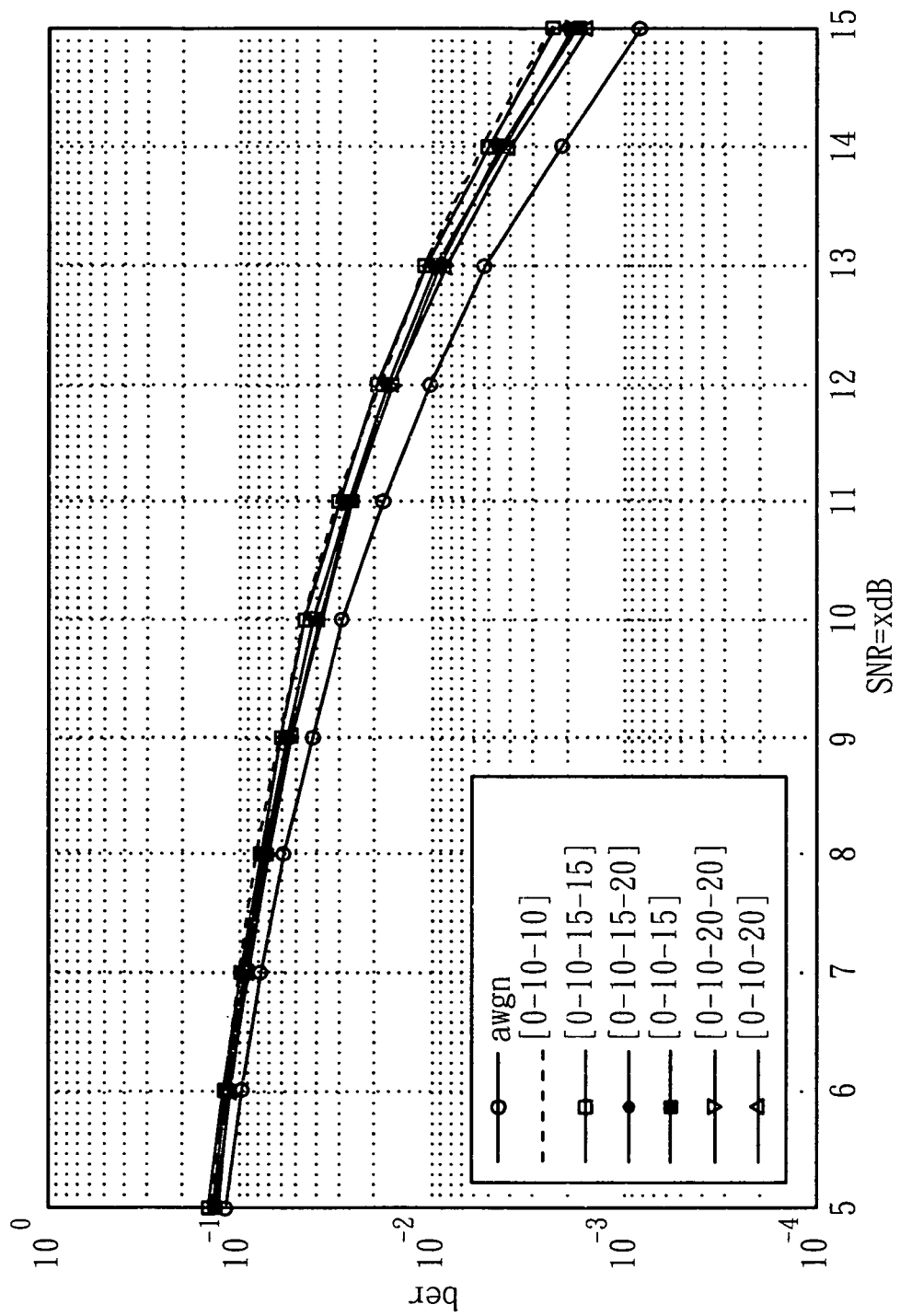
FIG. 5 is a schematic graph of bit error rates of a first estimated symbol according to the invention.
Figure 6:
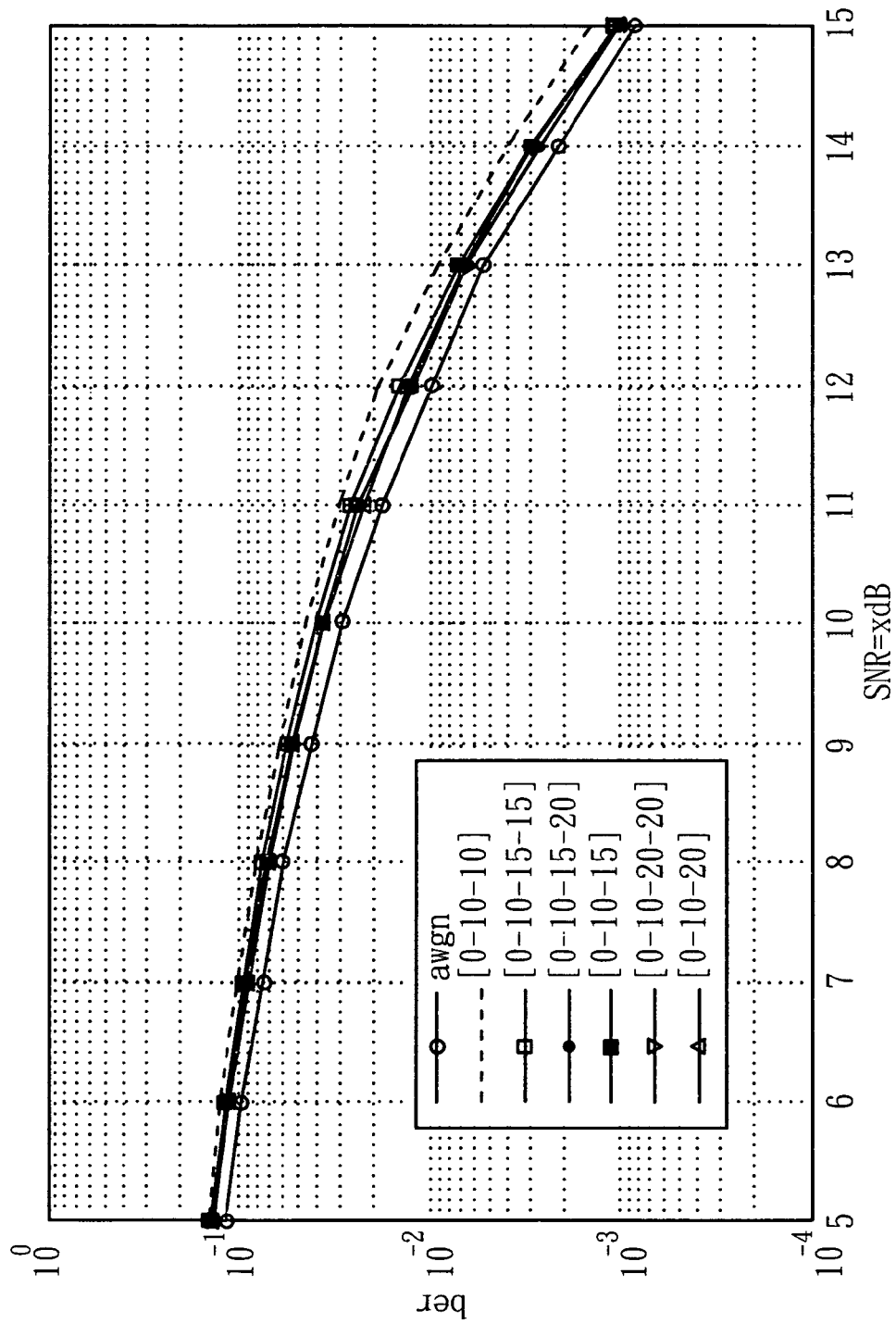
FIG. 6 is a schematic graph of bit error rates of a second estimated symbol according to the invention.

FIG. 5 is a schematic graph of bit error rates (BERs) of the first estimated symbol $I_{e1}(n)$ of the decision feedback equalization device 310 according to the invention. FIG. 6 is a schematic graph of bit error rates of the second estimated symbol $I_{e2}(n)$ of the maximum likelihood sequence estimation device 330 according to the invention.

When the maximum likelihood sequence estimation device 330 has a smaller SER than the device 310, the multiplexer 340 selects the output of the device 330 as the output of the inventive system. Conversely, the output of the device 310 is selected as the output of the system 300.

When the transmitter starts to receive a wireless signal or is just initialized, there is no preamble or the number of preambles in the sampled baseband signal r(n) is smaller than a threshold, and in this case the first estimated symbol $I_{e1}(n)$ output by the decision feedback equalization device makes the channel decoder to have a poor decoding performance. Thus, the SER is higher.

The ISI of the first estimated symbol $I_{e1}(n)$ is smaller than that of the sampled baseband signal r(n), and in this case the decision feedback equalization device 310 outputs the first estimated symbol $I_{e1}(n)$ to thus speed up the convergence of the maximum likelihood sequence estimation performed by the maximum likelihood sequence estimation device 330. When the number of preambles in the sampled baseband signal r(n) is smaller than a threshold, the maximum likelihood sequence estimation device 330 performs a maximum likelihood sequence estimation on the predetermined target channel response function h(t).

When the receiver starts to receive a wireless signal or is just initialized, the ISI of the first estimated symbol $I_{e1}(n)$ is smaller than that of the sampled baseband signal r(n), so the second estimated symbol $I_{e2}(n)$ generated by performing the maximum likelihood sequence estimation according to the first estimated symbol $I_{e1}(n)$ has an ISI smaller than the first estimated symbol $I_{e1}(n)$ which is generated according to the ISI of the sampled baseband signal r(n). In this case, the selection signal is at a low voltage, and accordingly the second estimated symbol $I_{e2}(n)$ output by the maximum likelihood sequence estimation device 330 is selected as the output of the system 300.

The SER of the system 300 is monitored. When the SER decreases, the selection signal is at a high voltage, and accordingly the first estimated symbol $I_{e1}(n)$ output by the decision feedback equalization device 310 is selected as the output of the system 300 to thereby indicate that the coefficients of the decision feedback equalization device 310 are updated to be closer to a time-variant channel. Namely, the ISI of the first estimated symbol $I_{e1}(n)$ is relatively reduced or canceled, so the first estimated symbol $I_{e1}(n)$ is selected as the output of the system 300. In this case, the device 330 can be set to be an idle or suspend state to reduce the power consumption.

Figure 7:
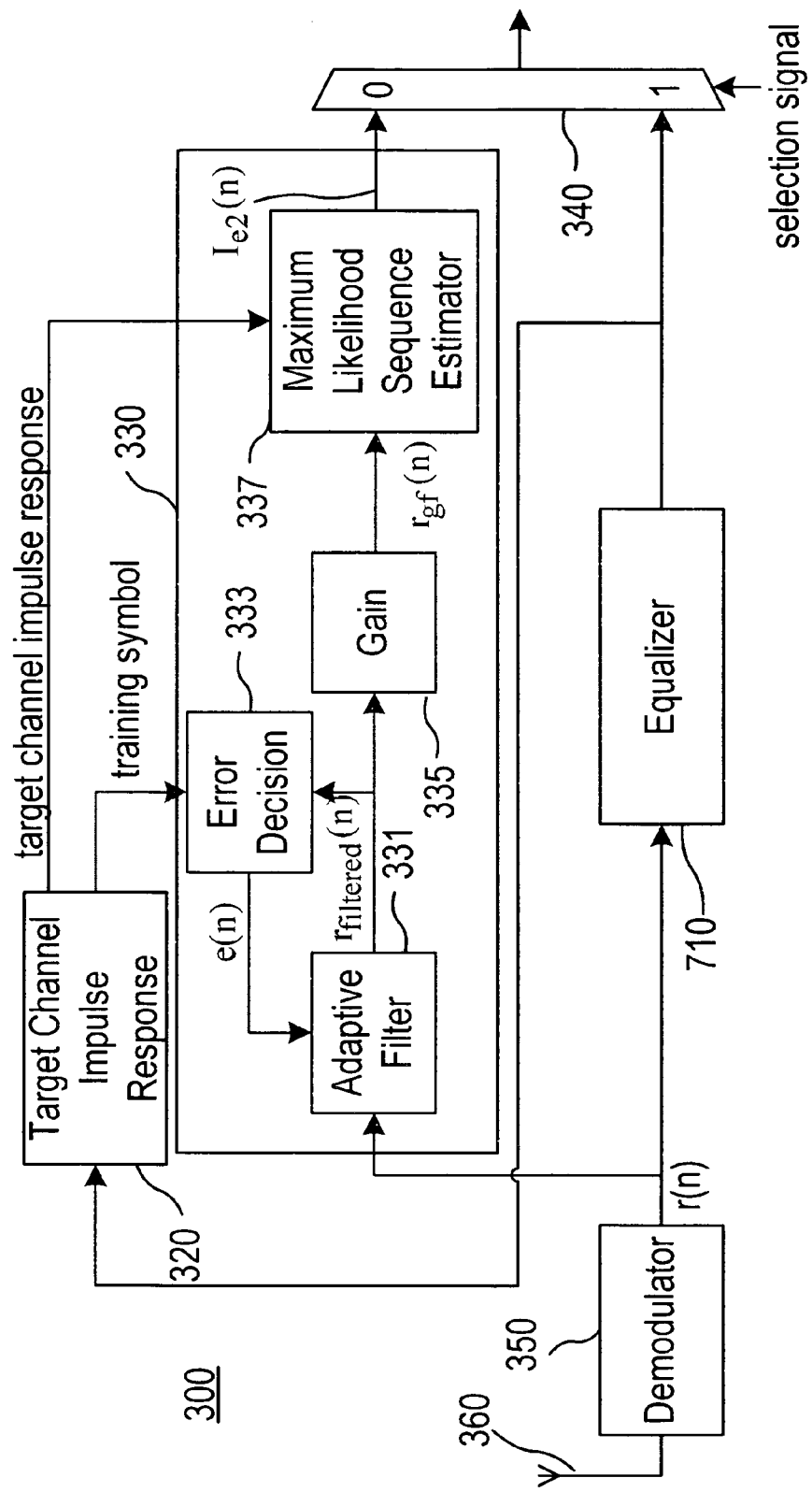
FIG. 7 is a block diagram of the hybrid equalization system according to another embodiment of the invention.

FIG. 7 is a block diagram of the hybrid equalization system 700 according to another embodiment of the invention. This embodiment is similar to the previous one, shown in FIG. 3, except that the system 700 uses an equalization device 710 to replace the decision feedback equalization device 310 of the system 300. The operation of the equalization device 710 is well known to those skilled in the art, and thus a detailed description is deemed unnecessary. As cited, the invention can achieve the purpose of an MLSE equalizer without performing any channel estimation when the amount of preamble symbols in a transmitting signal is very few.

Although the present invention has been explained in relation to its preferred embodiment, it is to be understood that many other possible modifications and variations can be made without departing from the spirit and scope of the invention as hereinafter claimed.

What is claimed is:

1. A hybrid equalization system for use in a receiver of a wireless communication system, comprising:

a decision feedback equalization device for receiving a sampled baseband signal and performing an equalization operation on the sampled baseband signal so as to generate a first estimated symbol;

a target channel impulse response device connected to the decision feedback equalization device for receiving the first estimated symbol so as to generate a target channel impulse response and a training symbol corresponding to the target channel impulse response according to a predetermined target channel response function;

a maximum likelihood sequence estimation device connected to the target channel impulse response device for receiving the sampled baseband signal, the target channel impulse response, and the training symbol so as to perform a maximum likelihood sequence estimation on the sampled baseband signal trained by the training symbol and generate a second estimated symbol; and a multiplexer connected to the decision feedback equalization device and the maximum likelihood sequence estimation device for selecting the first estimated symbol or the second estimated symbol as an output of the hybrid equalization system according to a selection signal.

2. The hybrid equalization system as claimed in claim 1, further comprising a demodulator for receiving a radio signal and performing an analog to digital conversion, carrier recovery, and timing recovery operation on the radio signal so as to generate the sampled baseband signal.

3. The hybrid equalization system as claimed in claim 2, wherein the decision feedback equalization device comprises:
- a feed-forward equalizer connected to the demodulator for filtering the sampled baseband signal and generating a feed-forward equalization signal so as to cancel a precursor ISI in the sampled baseband signal;
- an adder connected to the feed-forward equalizer for receiving the feed-forward equalization signal and a feedback equalization signal so as to generate an equalization signal;
- a decision device connected to the adder for comparing the equalization signal with multiple equalized signal levels so as to output the first estimated symbol and a symbol error; and
- a feedback equalizer connected to the decision device and the adder for filtering the first estimated symbol and generating the feedback equalization signal so as to cancel a post-cursor ISI in the sampled baseband signal.

4. The hybrid equalization system as claimed in claim 3, wherein the feed-forward equalizer is connected to the decision device in order to update coefficients of the feed-forward equalizer according to the sampled baseband signal and the symbol error.

5. The hybrid equalization system as claimed in claim 4, wherein the feed-forward equalizer uses a least mean square (LMS) operation to update the coefficients of the feed-forward equalizer.

6. The hybrid equalization system as claimed in claim 4, wherein the feed-forward equalizer is a symbol or fractionally spaced equalizer.

7. The hybrid equalization system as claimed in claim 4, wherein the maximum likelihood sequence estimation device comprises:
- an adaptive filter for filtering the sampled baseband signal so as to generate a filtered signal;
- an error decision device connected to the target channel impulse response device and the adaptive filter for generating an error signal according to the training symbol and the filtered signal so as to update coefficients of the adaptive filter;
- a gain device connected to the adaptive filter for performing a gain adjustment on the filtered signal so as to generate a gained filter signal; and
- a maximum likelihood sequence estimator connected to the gain device and the target channel impulse response device for performing a maximum likelihood sequence estimation on the target channel impulse response and the gained filter signal so as to generate the second estimated symbol.

8. The hybrid equalization system as claimed in claim 1, wherein when a number of preambles in the sampled baseband signal is smaller than a threshold, the decision feedback equalization device outputs the first estimated symbol to thus speed up convergence of the maximum likelihood sequence estimation performed by the maximum likelihood sequence estimation device.

9. The hybrid equalization system as claimed in claim 1, wherein the maximum likelihood sequence estimation device performs the maximum likelihood sequence estimation on the predetermined target channel response function.

10. The hybrid equalization system as claimed in claim 8, wherein the selection signal is at a low voltage to accordingly select the second estimated symbol output by the maximum likelihood sequence estimation device for use as the output of the hybrid equalization system, and the selection signal becomes a high voltage when a symbol error rate (SER) of the hybrid equalization system decreases, so as to select the first estimated symbol output by the decision feedback equalization device for use as the output of the hybrid equalization system.

11. A hybrid equalization system for use in a receiver of a wireless communication system, comprising:
- an equalization device for receiving a sampled baseband signal and performing an equalization operation on the sampled baseband signal so as to generate a first estimated symbol;
- a target channel impulse response device connected to the equalization device for receiving the first estimated symbol so as to generate a target channel impulse response and a training symbol corresponding to the target channel impulse response according to a predetermined target channel response function;
- a maximum likelihood sequence estimation device connected to the target channel impulse response device for receiving the sampled baseband signal, the target channel impulse response, and the training symbol so as to perform a maximum likelihood sequence estimation on the sampled baseband signal trained by the training symbol and generate a second estimated symbol; and
- a multiplexer connected to the equalization device and the maximum likelihood sequence estimation device for selecting the first estimated symbol or the second estimated symbol for use as an output of the hybrid equalization system according to a selection signal.

* * * * *